(12) United States Patent
Croft et al.

(10) Patent No.: US 8,558,102 B2
(45) Date of Patent: Oct. 15, 2013

(54) ROTATABLE JUNCTION BOX FOR A SOLAR MODULE

(75) Inventors: Steven Croft, Menlo Park, CA (US); Shawn Everson, Fremont, CA (US)

(73) Assignee: MIASOLE, Santa Clara, CA (US)

( * ) Notice: Subject to any disclaimer, the term of this patent is extended or adjusted under 35 U.S.C. 154(b) by 1064 days.

(21) Appl. No.: 12/558,336

(22) Filed: Sep. 11, 2009

(65) Prior Publication Data
US 2011/0061705 A1    Mar. 17, 2011

(51) Int. Cl.
*H01L 31/042* (2006.01)

(52) U.S. Cl.
USPC .......................... 136/244; 136/251

(58) Field of Classification Search
USPC ................ 164/243–265; 439/49, 189
See application file for complete search history.

(56) References Cited

U.S. PATENT DOCUMENTS

| | | | |
|---|---|---|---|
| 1,014,718 A | 1/1912 | Parsons | |
| 3,260,835 A | 7/1966 | Soukey et al. | |
| 3,575,721 A | 4/1971 | Mann | |
| 3,575,752 A | 4/1971 | Mann | |
| 4,089,576 A | 5/1978 | Barchet | |
| 4,310,211 A | 1/1982 | Bunnell et al. | |
| 4,460,232 A | 7/1984 | Sotolongo | |
| 5,290,366 A | 3/1994 | Riermeier et al. | |
| 5,951,785 A * | 9/1999 | Uchihashi et al. | 136/251 |
| 6,039,616 A | 3/2000 | Pereira et al. | |
| 6,093,884 A | 7/2000 | Toyomura et al. | |
| 6,249,966 B1 | 6/2001 | Pereira et al. | |
| 6,337,436 B1 | 1/2002 | Ganz | |
| 6,475,043 B2 | 11/2002 | Pereira et al. | |
| 6,520,812 B1 | 2/2003 | Machado | |
| 6,599,156 B2 | 7/2003 | Pereira et al. | |
| 6,599,157 B2 | 7/2003 | Pereira et al. | |
| 6,607,409 B2 | 8/2003 | Machado | |
| 6,649,822 B2 | 11/2003 | Eguchi et al. | |
| 6,676,455 B2 | 1/2004 | Machado et al. | |
| 6,780,071 B2 | 8/2004 | Pereira et al. | |
| 6,790,104 B2 | 9/2004 | Antaya et al. | |

(Continued)

FOREIGN PATENT DOCUMENTS

JP          61004266 A  *  1/1986
JP          2002/359389      12/2002

(Continued)

OTHER PUBLICATIONS

International Search Report and Written Opinion mailed Jan. 21, 2011, for Application No. PCT/US2010/040426.

(Continued)

*Primary Examiner* — Kevin P Kerns
*Assistant Examiner* — Kevin E Yoon
(74) *Attorney, Agent, or Firm* — Weaver Austin Villeneuve & Sampson LLP

(57) ABSTRACT

Provided are novel junction boxes for solar modules. The junction boxes or J-boxes can be rotated or otherwise moved to change the module's electrical connection state. According to various embodiments, the J-boxes are movable between two or more orientations each associated with an electrical connection configuration. In particular embodiments, the configurations include two or more of an on position, an off position, an on series configuration, an on series-parallel configuration, and a bypass configuration. A J-box according to certain embodiments includes a replaceable insert. The insert may include one or more bypass diodes, an inverter or a DC/DC converter.

20 Claims, 11 Drawing Sheets

(56) References Cited

U.S. PATENT DOCUMENTS

| | | |
|---|---|---|
| 6,945,831 B2 | 9/2005 | Pereira et al. |
| 7,083,481 B2 | 8/2006 | Pereira et al. |
| 7,182,625 B2 | 2/2007 | Machado et al. |
| 7,226,299 B2 | 6/2007 | Pereira et al. |
| 7,255,589 B2 | 8/2007 | Machado et al. |
| 7,296,347 B2 | 11/2007 | Antaya et al. |
| 7,371,083 B2 | 5/2008 | Pereira et al. |
| 7,438,610 B2 | 10/2008 | Machado et al. |
| 7,530,843 B1 | 5/2009 | Tesfay et al. |
| 7,553,204 B2 | 6/2009 | Pereira et al. |
| 7,662,001 B2 | 2/2010 | Machado et al. |
| 7,700,878 B2 | 4/2010 | Antaya et al. |
| 7,963,802 B2 | 6/2011 | Corneille et al. |
| 2002/0004325 A1 | 1/2002 | Pereira et al. |
| 2002/0014262 A1 | 2/2002 | Matsushita et al. |
| 2002/0187690 A1 | 12/2002 | Pereira et al. |
| 2003/0013352 A1 | 1/2003 | Machado |
| 2003/0017756 A1 | 1/2003 | Pereira et al. |
| 2003/0203666 A1 | 10/2003 | Pereira et al. |
| 2004/0018782 A1 | 1/2004 | Antaya et al. |
| 2004/0237302 A1 | 12/2004 | Antaya et al. |
| 2004/0248477 A1 | 12/2004 | Pereira et al. |
| 2005/0239348 A1 | 10/2005 | Pereira et al. |
| 2006/0121771 A1 | 6/2006 | Machado et al. |
| 2007/0287322 A1 | 12/2007 | Machado et al. |
| 2008/0041434 A1 | 2/2008 | Adriani et al. |
| 2008/0214064 A1 | 9/2008 | Pereira et al. |
| 2008/0283118 A1* | 11/2008 | Rotzoll et al. ............... 136/251 |
| 2008/0289682 A1 | 11/2008 | Adriani et al. |
| 2009/0114262 A1 | 5/2009 | Adriani et al. |
| 2009/0149069 A1 | 6/2009 | Carcangiu et al. |
| 2010/0068924 A1 | 3/2010 | Nightingale et al. |
| 2010/0154859 A1 | 6/2010 | Antaya et al. |
| 2010/0263704 A1* | 10/2010 | Fornage et al. ............... 136/244 |
| 2010/0294339 A1 | 11/2010 | Hollars et al. |
| 2010/0326490 A1* | 12/2010 | Tagliareni et al. ............ 136/244 |
| 2011/0061705 A1 | 3/2011 | Croft et al. |
| 2011/0277811 A1 | 11/2011 | Corneille et al. |
| 2011/0308562 A1 | 12/2011 | Shufflebotham |

FOREIGN PATENT DOCUMENTS

| | | |
|---|---|---|
| JP | 2004/0253475 | 9/2004 |
| JP | 2005/057274 | 3/2005 |
| JP | 2005/0129773 | 5/2005 |
| JP | 2005244144 A * | 9/2005 |

OTHER PUBLICATIONS

Notice of Allowance for U.S. Appl. No. 12/684,278, mailed Mar. 7, 2011.
Allowed Claims as of Apr. 1, 2011 (312 Amendment entered), for U.S. Appl. No. 12/684,278.
Corneille, et al., "External Electrical Connectors for Solar Modules," U.S. Appl. No. 13/104,885, filed May 10, 2011.
Notice of Allowance for U.S. Appl. No. 13/104,885, mailed Oct. 13, 2011.
Allowed Claims as of Oct. 13, 2011, for U.S. Appl. No. 13/104,885.
Corneille, et al., "External Electrical Connectors for Solar Modules," U.S. Appl. No. 13/632,727, filed Jan. 31, 2012.
Shufflebotham Paul, "Photovoltaic Module Electrical Connectors," U.S. Appl. No. 12/820,408, filed Jun. 22, 2010.
International Search Report and Written Opinion mailed Feb. 12, 2009, for Application No. PCT/US2008/008513.
International Bureau of WIPO. International Preliminary Report on Patentability, for Application No. PCT/US2008/008513.
U.S. Appl. No. 12/544,984, Office Action mailed Jan. 5, 2012.

* cited by examiner

ROTATABLE JUNCTION BOX FOR A SOLAR MODULE

BACKGROUND OF THE INVENTION

Photovoltaic cells are widely used for generation of electricity, with multiple photovoltaic cells interconnected in module assemblies. Such modules may in turn be arranged in arrays and integrated into building structures or otherwise assembled to convert solar energy into electricity by the photovoltaic effect. However, a string of live modules connected in series is capable of delivering several amperes of current at lethal voltages, i.e., greater than 300 V.

SUMMARY OF THE INVENTION

Provided are novel junction boxes for solar modules. The junction boxes or J-boxes can be rotated or otherwise moved or changed to change the module's electrical connection state. According to various embodiments, the J-boxes are changeable between two or more orientations each associated with an electrical connection configuration. In particular embodiments, the configurations include two or more of an on position, an off position, an on series configuration, an on series-parallel configuration, and a bypass configuration. A J-box according to certain embodiments includes a fixed part and a separable part or insert. The insert may include one or more bypass diodes, an inverter or a DC/DC converter.

Also provided are detachable inverters, DC/DC converters, diodes and other detachable electrical circuitry components for solar modules. A detachable inverter or other component according to certain embodiments includes a fixed part and a separable part, i.e., an insert. The insert may include one or more bypass diodes, inverters, DC/DC converters or combinations thereof. According to various embodiments, the insert may or may not be movable between operating positions or orientations associated with different electrical connection configurations.

One aspect of the invention relates to a junction box for a solar module assembly that includes a plurality of interconnected solar cells. The junction box is mountable on or connectable to the solar module assembly and movable between at least two operating positions, with each operating position is associated with a different solar cell electrical connection configuration. In certain embodiments, the junction box is movable by rotation. The junction box may include a housing and a movable insert. In certain embodiments, the insert is replaceable, so that it can be removed from the housing, rotated or otherwise moved to another orientation, and replaced into the housing in its new orientation. As used herein, a replaceable insert generally refers to an insert that may be physically removed or detached from housing, and reinserted as desired. In certain cases, however, it may be desirable to replace the insert with a different insert. In other embodiments, the insert may be movable between operating positions without being physically removed from the housing.

The housing may contain external connection points, e.g., such as connectors attached to the housing directly or via cables housed within or attached to the housing. At least one solar cell electrical connection configuration may be selected from a series configuration, a series-parallel configuration, an on position, an off position, and a bypass configuration.

An insert may include at least some of connectors, diodes and conductors configured such that moving the insert between two operating positions changes the solar cell electrical connection configuration. In further embodiments, the junction box may contain an integral element such as DC/DC converter and/or an inverter. These may be located in the insert for easy replacement with new components. According to various embodiments, the insert may be of any appropriate dimension or form to be inserted into, attached or otherwise configured to interface with a housing or other fixed portion.

Another aspect of the invention relates to detachable assemblies for a solar module, e.g., detachable inverters, DC/DC converters, diodes or detachable inserts containing these or other components. In certain embodiments, the detachable assemblies include a fixed part connectable to the solar module assembly and fixable with respect thereto, with the fixed part housing or containing an electrical pathway connectable to the plurality of interconnected solar cells; and a detachable insert housing or containing one or more circuitry components and configured to interface with the fixed part. The detachable insert interfaces with the fixed part such that, in an operating position, the one or more circuitry components are electrically connected to the electrical pathway. In a detached position, the one or more circuitry components are unconnected to the electrical pathway. The detachable insert may be removed from the module, e.g., for easy replacement of the insert or the components therein. Components such as inverters, DC/DC converters, diodes, connectors, conductors and combinations thereof may be wholly or partially housed within the insert.

According to various embodiments, the detachable insert may be configured to interface with the fixed part in a single operating position, e.g., when inserted, the components in the insert are active, and when detached, the components in the insert are not active. In certain embodiment, the insert may be movable between different operating positions. For example, the insert may be movable between at least two operating positions, each associated with a solar cell electrical connection configuration, e.g., between off, on-series, etc., as described above. Also, the insert may include a tool interface feature configured to interface with a tool whereby the insert can be detached from the fixed part.

Yet another embodiment of the invention relates to a detachable insert for a solar module. The detachable insert includes one or more circuitry components, wherein the insert is configured to interface with a fixed part containing an electrical pathway to the plurality of interconnected solar cells, such that in an operating position, the one or more circuitry components are electrically connected to the electrical pathway, and in a detached position, the one or more circuitry components are unconnected to the electrical pathway.

In certain embodiments, the junction boxes, detachable assembly or inserts described herein further includes a tool interface feature configured to interface with a tool whereby the junction box, assembly or insert can be detached and/or moved between alternative operating positions. The junction box, assembly or insert may be movable, detachable and/or reattachable only with the use of a tool.

Another aspect of the invention relates to a solar module assembly including a plurality of interconnected solar modules, each module having at least one solar cell string and at least one external connection mechanism for interconnecting the modules, wherein at least one external connection mechanism is movable between operation positions to change the electrical connection configuration of interconnected modules or connected cell strings within a module.

Yet another aspect of the invention relates to a method of installing or servicing a solar module system including at least one solar module having a plurality of interconnected solar cells. The method involves moving or rotating a junction box mounted on a solar module between a first operating position and a second operating position to thereby change the solar cell electrical connection configuration. In certain embodiments, rotating the junction box involves using a tool to interface with a tool interface feature on the junction box.

Yet another aspect of the invention relates to a method of installing or servicing a solar module system including at least one solar module having a plurality of interconnected solar cells. The method includes removing a detachable insert comprising one or more circuitry components from a fixed part connected to the at least one solar module; replacing the one more circuitry components; and reattaching the detachable insert including the replacement components.

These and other aspects of the invention are described further below with reference to the figures.

BRIEF DESCRIPTION OF THE DRAWINGS

FIG. 2 shows view of a junction box including removable insert mounted on a solar cell module. Views of the insert in removed and inserted positions are shown FIG. 2A depicts the insert in a removed (non-operating) position; FIG. 2B depicts the inserted in an operating position associated with an orientation of the insert.

FIG. 2C depicts the insert in a removed (non-operating) position; FIG. 2D depicts the inserted in an operating position associated with an orientation of the insert.

DETAILED DESCRIPTION

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention. For example, while the description below refers chiefly to junction boxes, external connection boxes, inverters, DC/DC converters and the like for solar modules and solar module assemblies, the movable and/or detachable junction boxes, inserts, inverters and the like may be used with other electrical devices and assemblies. One of skill in the art will understand from the description presented herein how to implement the inventive junction boxes, inserts, inverters and other units and related methods described herein with other types of devices and assemblies that include electrical connections. Also, in the following description, numerous specific details are set forth in order to provide a thorough understanding of the present invention. The present invention may be practiced without some or all of these specific details. In other instances, well known mechanical apparatuses and/or process operations have not been described in detail in order not to unnecessarily obscure the present invention.

Figure 1:
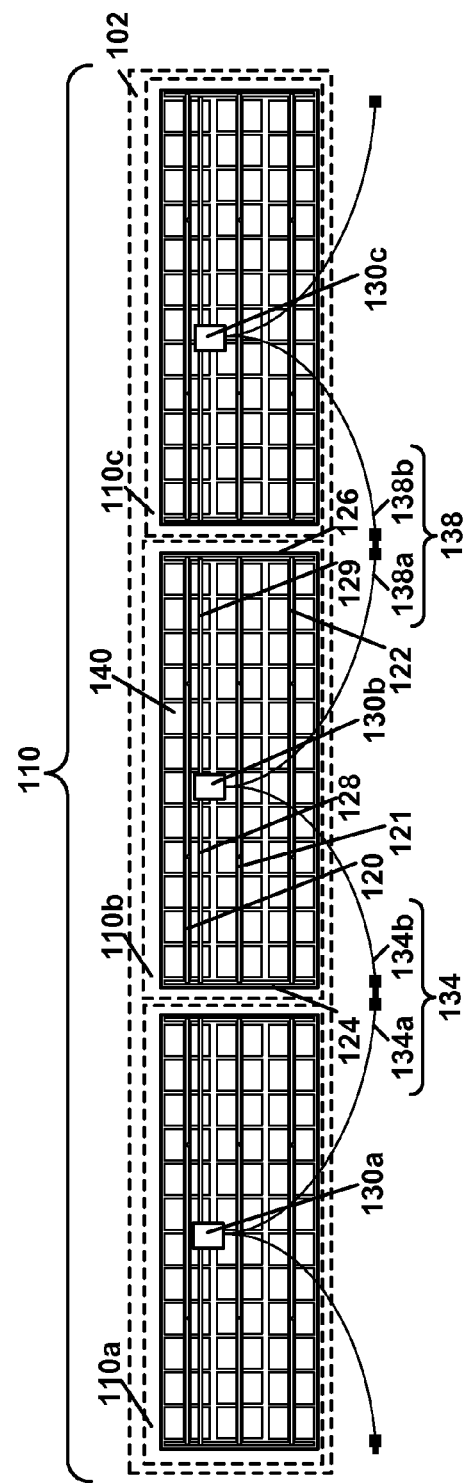
FIG. 1 shows a plan view of a solar-cell array including a plurality of solar-cell modules and centrally-mounted junction boxes in accordance with various embodiments.

Embodiments of the present invention relate to junction boxes for solar modules. According to various embodiments, the junction boxes described herein provide a connection point for solar modules to an external grid, battery, etc. In certain embodiments, a junction box is associated with a solar module or panel in a solar panel array. FIG. 1 is a plan view of a solar module array 102 including a plurality 110 of solar-cell modules 110a, 110b and 110c and centrally-mounted junction boxes 130a, 130b and 130c. Each module includes a set of interconnected solar cells 140. The cells may be any type of photovoltaic cells, including but not limited to CIS, CIGS, CdTe or silicon photovoltaic cells.

Although the figure depicts the solar cells arranged in three rows, the invention is not limited to any particular arrangement of interconnected cells within the module, but may be used with any appropriate arrangement. As will become apparent from the discussion below, according to various embodiments, the cells 140 are connected in series, series/parallel, or in certain embodiments, switchable via the rotatable junction boxes described herein, between series and series/parallel configurations and other wiring configurations. The modules may also include one or more diodes connected to one or more photovoltaic cells of a photovoltaic module such that the diode will conduct electrical current if the cell(s) become damaged or shaded. For example, in the example shown in FIG. 1, each module includes a plurality of diodes, depicted as first, second and third diode assemblies 120, 121 and 122 (shown only for solar-cell module 110b). As described further below, in certain embodiments, the modules described herein have only one bypass diode. Busbars may be used for current collection; in FIG. 1, a first busbar 124 and a terminating busbar 126 are each electrically coupled with the first, second and third diode assemblies 120, 121 and 122. Busbars 128 and 129 provide additional wiring to junction box 130b to collect current. Each junction box has two cables or connectors attached to it, each configured to form an interconnector with another module. Interconnector 134 connects centrally-mounted junction boxes 130a and 130b to connect solar modules 110a and 110b; interconnector 138 connects centrally-mounted junction boxes 130b and 130c to interconnect solar-cell modules 110b and 110c. Junction box 130b is attached to cable 134b and cable 138a. With cable 134a, attached to junction box 130a, cable 134b connects module 110b to module 110a. With cable 138b, attached to module 110c, cable 138a connects module 110b to module 110c. Connectors joining the two cables of each interconnect are also shown. According to various embodiments, the modules may be connected in series, parallel, series-parallel, etc. The solar panel array may be mounted on a roof or other surface to absorb solar energy and convert it to electricity. In use, DC current is delivered from the modules via the junction boxes and to an inverter for conversion to AC. In certain embodiments, an inverter is included in the junction box to convert DC to AC at the module level.

The modules and solar array described above is an example of solar module, junction box and array assemblies within the scope of the invention. The junction box may be placed as appropriate on the module—at its center, edge, etc. Cell wiring schemes, including the presence, absence, number or arrangement of busbars and diodes may also be varied as appropriate.

As used herein the terms "junction box" or "J-box" refers to a unit configured to contain or house an electrical pathway, typically between the cells or internal circuitry of a solar module and one or more external connectors. A junction box as described herein may a single, integral container or may include multiple parts or members. As described further below, in certain embodiments, the junction boxes described herein include a fixed part and a movable and/or separable part. In certain embodiments, the junction boxes described herein include one or more of an external connection boxes housing one or more leads or connection points to other modules, e.g., with two such external connection boxes on a module. As is also described further below, the electrical pathway may be interrupted, e.g., when the junction box is in an "off" position.

As indicated above, the J-boxes according to certain embodiments are movable between orientations or operating positions to change an electrical connection configuration. As described herein, the term "movable J-box" includes J-boxes in which the entire J-box is movable, as well as those that have a fixed part, such as a housing or base, and a movable part, also referred to herein as an insert. The fixed part is fixed or fixable with respect to the module, with the movable part movable with respect to the module and/or the fixed part. According to various embodiments, in use, the fixed part may be a housing or base mounted on or otherwise attached to the module, e.g., by adhesive sealing, mechanical attachment, magnetic force, etc. Generally, at least one connection or pathway to the internal circuitry of the module is housed within the fixed part. The location of the fixed part relative to its respective photovoltaic module is not particularly restricted as long as the inverter is electrically connected to the module, i.e., it may be adjacent to the module and connected to it via busbars, etc. According to various embodiments, other components may also be housed within or attached to the fixed portion, including but not limited to one or more conductors, diodes, and connectors. Generally, at least one conductor is housed within the movable part. The movable part may also contain one or more connectors, diodes and conductors. According to certain embodiments, the connectors, diodes and conductors in the fixed and/or movable parts are configured such that when the movable part is moved between operating positions, it interfaces with the fixed part to change an electrical connection configuration. In the discussion herein, the movable part is sometimes referred to as an "insert." As used herein, the term "insert" includes any part or member that is movable and/or separable from a fixed part, and configured to interface with the fixed part to provide an electrical connection. In certain embodiments, the J-boxes may include multiple fixed parts and/or multiple movable parts. Also in certain embodiments, a fixed part and/or a movable part may itself include multiple parts or members, all or a subset of which are configured to interface to provide an electrical connection. If detachable, the inserts described herein may be reattached to the fixed parts by any appropriate method depending on their configurations, e.g., by inserting all or a portion of the insert into a recess, inserting all or a portion of the fixed part into a recess on the insert, placing the insert adjacent to the fixed part, etc. Generally, once the insert is attached or reattached to the fixed part in an operating position, it is fixed with respect to the fixed part and module, until it is intentionally detached or moved.

Figure 2A:
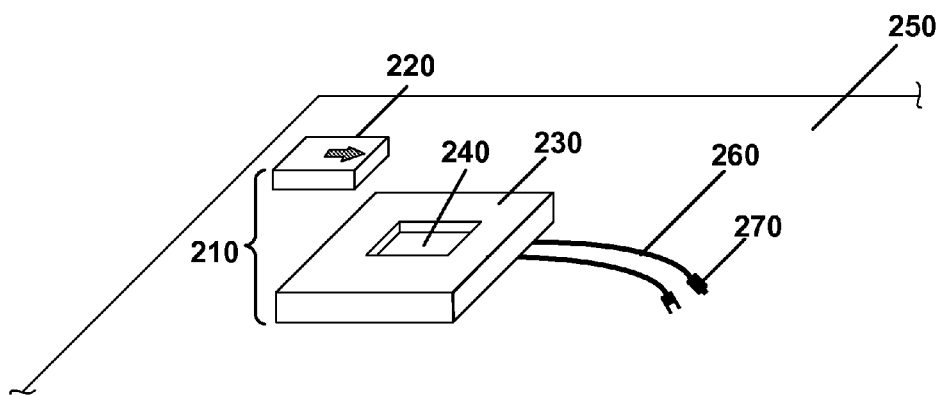
FIGS. 2A and 2B depicts a junction box including replaceable insert and junction box housing mounted on a solar module.
Figure 2B:
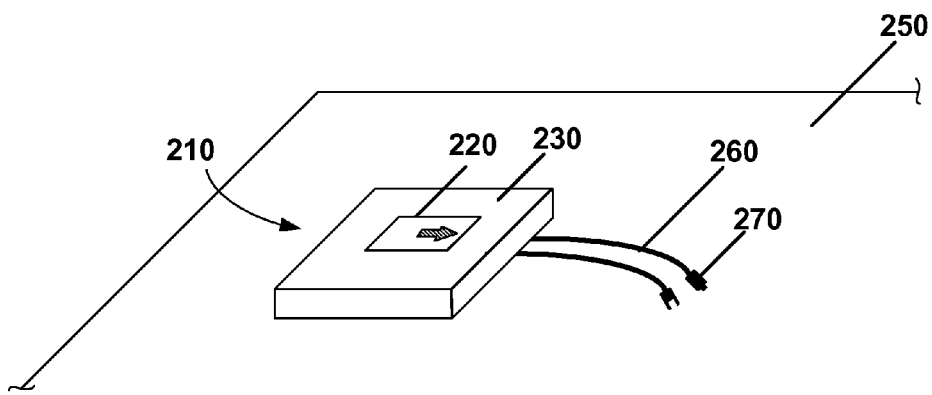

In an operating position, the J-boxes and solar modules and arrays including them may be safely operated, without exposing electrical components, etc. In certain embodiments, the J-boxes include a replaceable insert. FIG. 2A depicts a J-box 210 including replaceable insert 220 and J-box housing 230 mounted on a solar module 250. Housing 230 includes a recess 240 configured to accept insert 220. J-box housing 230 serves as the connection point to other modules, the grid, etc., via cables 260 having connectors 270 attached. The connectors 270 may also be directly attached to or part of the housing 230. Insert 220 is in a particular orientation as indicated by the arrow, and may be rotated to different orientations. With the insert detached or removed as in FIG. 2A, the J-box 210, insert 220 and, in certain embodiments, solar module 250 may be considered to be in a non-operating position. FIG. 2B depicts the J-box 210 once insert 220 is inserted into the housing 230 in the orientation indicated by the arrow. Inserted, the J-box 210 is in an operating position. In this orientation, the electrical connection is a particular configuration, e.g., on (current delivered to cables 260) or off (no current delivered to cables 260).

Figure 3A:
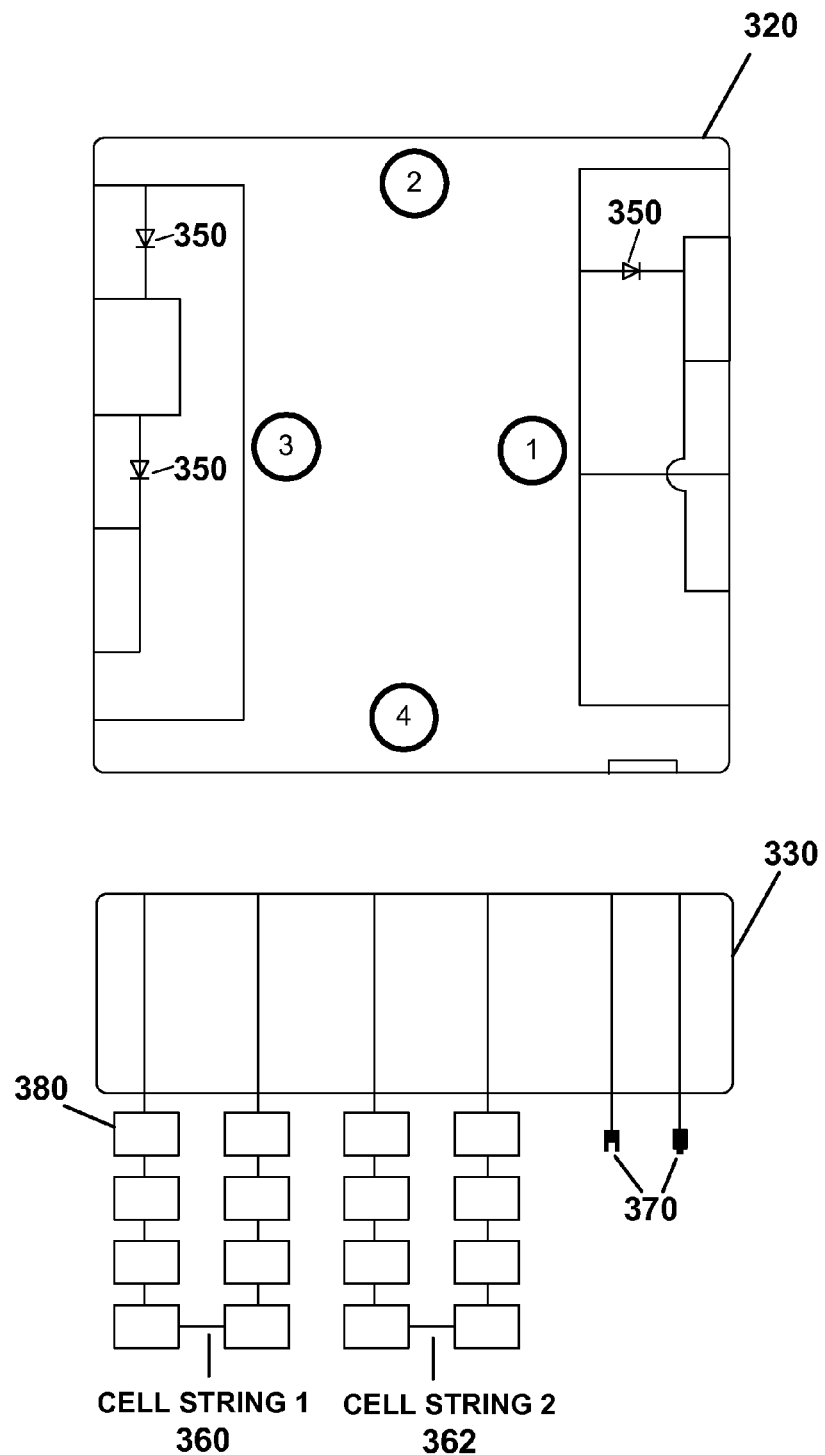
FIG. 3A depicts a rotatable insert and junction box housing connected to a solar module. The insert is in a non-operating position.

FIG. 3A depicts a J-box housing 330 and insert 320 for a solar module. Junction box housing 330 is connected to cell strings 360 and 362 of the module. Connectors 370 are attached to the housing 330. Insert 320 is movable between different positions, each of which is associated with a different electrical connection configuration. These positions are indicated as follows: 1: On parallel; 2: Off; 3: On series; and 4: Bypass. Insert 320 contains connectors and conductors configured such that, depending on its orientation, it changes the way in which the strings of cells 360 and 362 are interconnected and/or the way the module is connected to other modules. In the particular example shown in FIG. 3A, bypass diodes 350 are included in the insert 320. In certain embodiments, bypass diodes are located within the module laminate, e.g., as depicted in FIG. 1, and may be on a per-cell basis.

FIGS. 3B-3E depict insert 320 in each of its possible orientations as well as the associated electrical connection configuration of module and cell strings. First, in FIG. 3B, insert 320 is oriented such that cell string 360 and cell string 362 are wired in parallel. The electrical configuration of the cells 380 in FIG. 3B may also be referred to as series/parallel, with the cells in each string wired in series and the strings wired in parallel. Bypass diode 350 is operable to prevent current from flowing back into cells that are not generating power due to shade, cell failure, etc. When the resistance due to a shaded cell or cells is greater than that of the bypass diode 350, power is shunted through the diode.

Figure 3B:
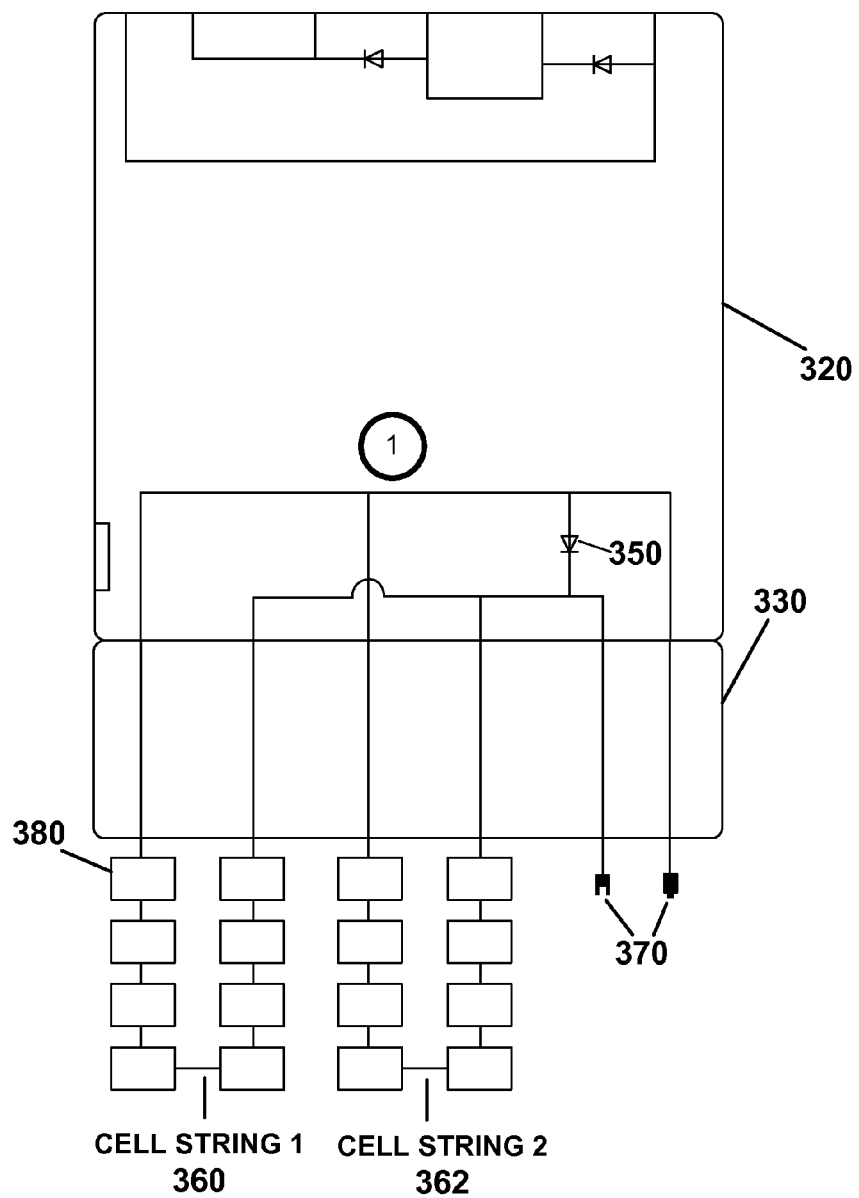
FIG. 3B depicts the insert shown in FIG. 3A oriented such that the cells are wired in series/parallel.
Figure 3C:
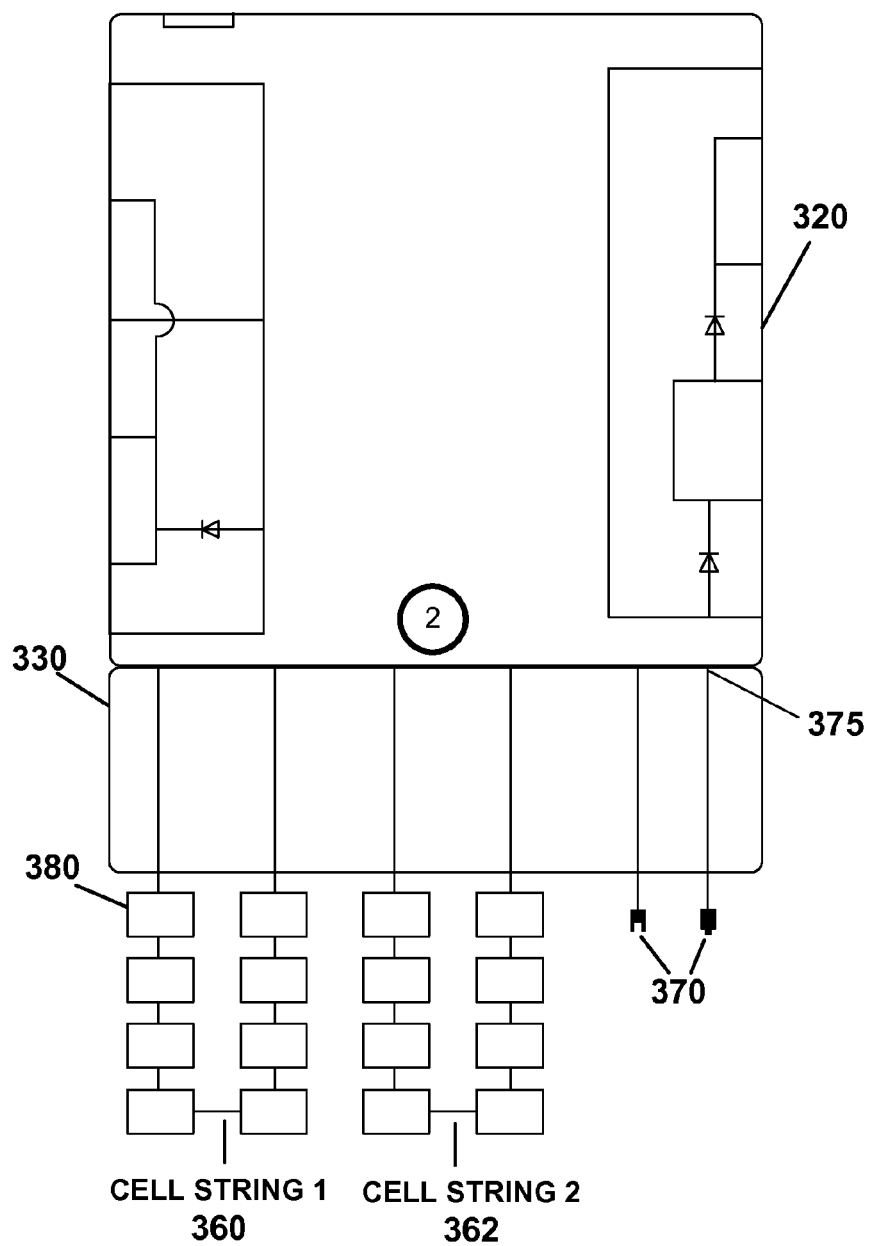
FIG. 3C depicts the insert shown in FIG. 3A oriented such that the module is off.

FIG. 3C depicts a DC-disconnect or off position. Here, there is an open circuit with no power is delivered to connectors 370. In certain embodiments, insert 330 provides a hermetic seal to protect module and J-box components and for safety. Placing the insert in this operating position ensures that leads are not exposed to the environment at housing interface 375. In other embodiments, an insert having no conductors or other components but configured to fit into the J-box housing may replace insert 330, for example, where a module is being taken out of service for a lengthy period.

Figure 3D:
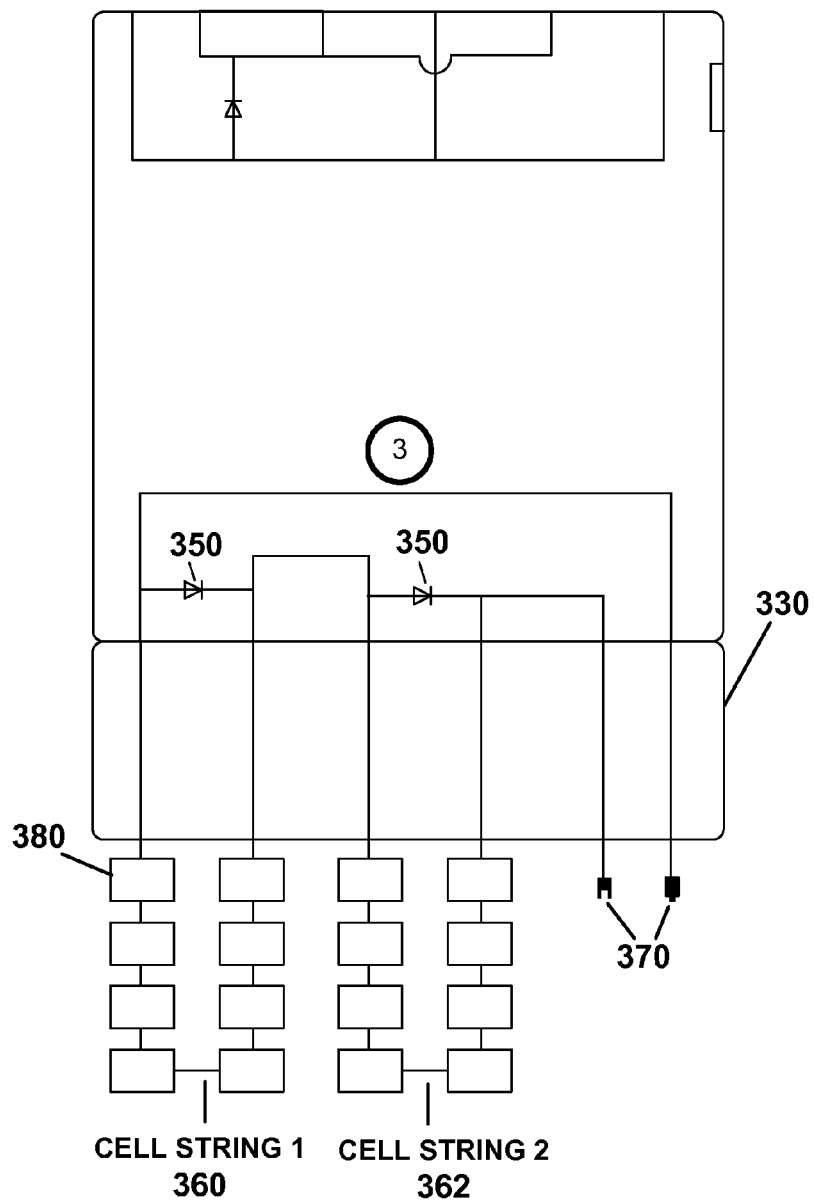
FIG. 3D depicts the insert shown in FIG. 3A oriented such that the cells are wired in series.

In FIG. 3D, insert 330 is positioned such that cell strings 360 and 362 are wired in series. Bypass diodes 350 are operable to bypass cell string 360 and/or 362 as needed. In certain embodiments, switching between parallel and series configurations (e.g., by rotating insert 330 from position 1 to position 3) allows each module to be run at its optimum point. For example, a series configuration yields a higher voltage and lower current than a parallel configuration. Changing from one configuration to another involves removing, rotating and replacing insert 330. Prior to the rotatable J-boxes described herein, individual jumpers within a junction box had to be swapped out to change the electrical configuration. While FIGS. 3B and 3D depict parallel and series configurations, respectively, and FIG. 3C depicts an off position, in certain embodiments, the J-box may have a single on position. This on position may compatible with cells strings wired in series and/or in parallel. One of skill in the art will understand that other or more complex cell wiring schemes may be employed.

Figure 3E:
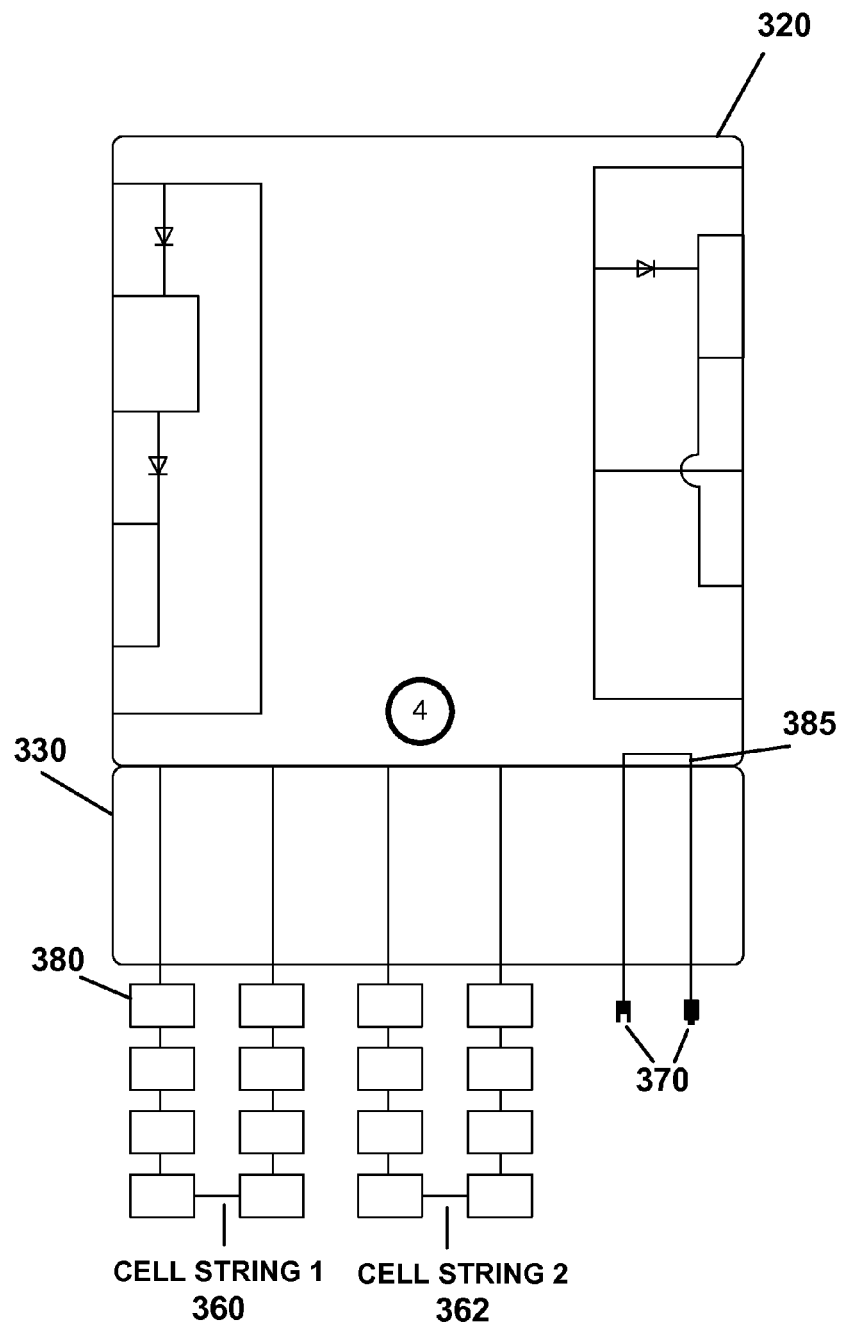
FIG. 3E depicts the insert shown in FIG. 3A oriented such that the module is bypassed.

In FIG. 3E, a bypass configuration is depicted. Here, current flows via conductor 385 to and from the modules connected via connectors 370. In this manner, a module can be taken out of service while allowing other modules in the array to continue to supply power to a grid or battery.

Figure 2C:
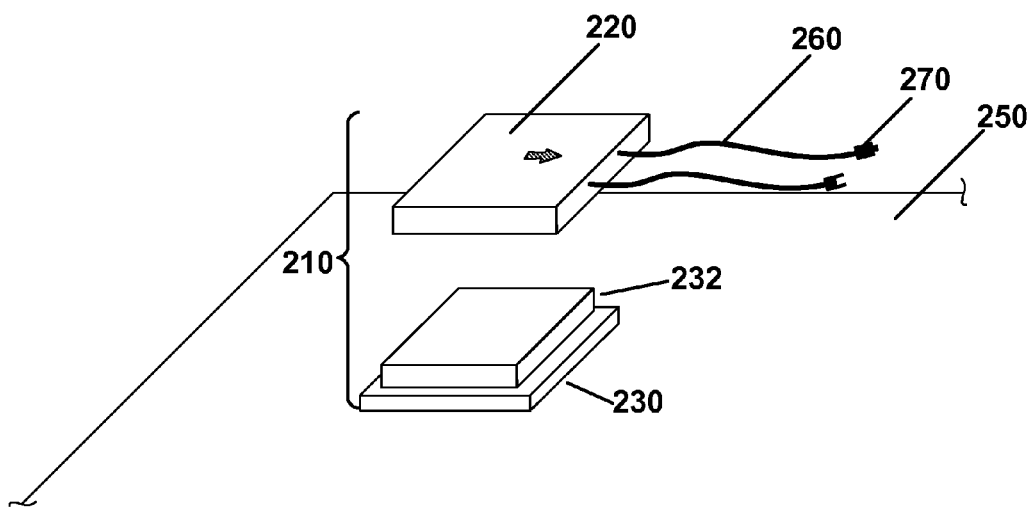
FIGS. 2C and 2D depict another example of a junction box including replaceable insert and junction box housing mounted on a solar module.
Figure 2D:
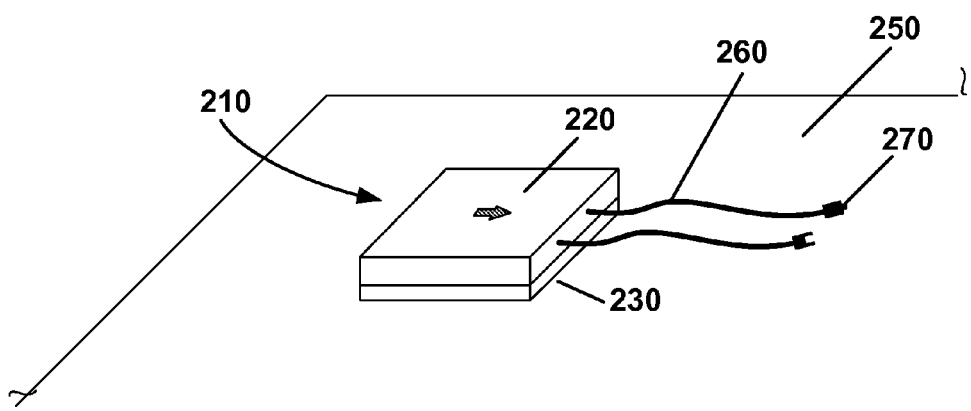

FIGS. 2C and 2D depict another embodiment in which a pluggable insert fits onto a base, with FIG. 2C showing the insert 220 in a detached position, and FIG. 2D showing the insert 220 in an operating position. Here, insert 220 is replaceable and has a recessed area (not shown) to fit onto raised portion 232 of housing or base 230, which is fixed to module 250. In the example shown in FIGS. 2C and 2D, external connectors 270 are attached via cables 260 to replaceable part 220. In this example, the part 220 may house only the leads to cables 260 (e.g., so the J-box is movable between two positions: on and off), or may include additional circuitry to be movable between other electrical connection states, e.g., on parallel, on series and/or bypass, instead of or in addition to these configurations. In FIGS. 2A-2D, the insert 220 is rotatable to interface with fixed part 230 in different orientations, each associated with a different operating position and electrical connection configuration. In other embodiments, described further below, the insert 220 is detachable but non-rotatable, i.e., there is a single operating position for the insert.

One of skill in the art will understand that various modifications may be made to the J-boxes depicted in FIGS. 2A-2D and 3A-3E without departing from the scope of the invention. For example, various conductors, connectors, diodes and other components housed or attached to the J-box may be either in the fixed part (e.g., housing or base 230 in FIGS. 2A-2D) or in the movable part (e.g., insert 220 in FIGS. 2A-2D) of the J-box. For example, the external connectors may be attached to either the fixed part of the J-box (as in FIGS. 2A and 2B) or the movable part of the J-box (as in FIGS. 2C and 2D). Similarly, per-module diodes may be housed in the movable or fixed part. As described above, in certain embodiments, diodes and the like are contained within the movable part for easy replacement. As described further below, in certain embodiments, the movable part may contain additional elements, including but not limited to, inverters, DC/DC converters and the like. In certain embodiments, elements such as diodes, inverters and the like are included in a movable part for easy replacement of the element, and/or easy replacement with a different movable part, e.g., to change an electrical connection configuration.

In certain embodiments, the J-box or insert is configured to change positions without being removed from module, housing or other fixed part. For example, an insert or J-box containing conductors, etc., may be configured to be moved laterally from the housing, e.g., by sliding, to disconnect a circuit, and then rotated to change the part or J-box orientation and electrical connection configuration, without removing the insert from the housing or module. An insert or J-box may change positions by pivoting around a post, without being removed from the housing or module. In certain embodiments, the insert or J-box may be partially removable from the housing or module, e.g., it may be tethered by a wire or spring. As indicated above, according to various embodiments, the insert is detachable or separable from the fixed part of the J-box, without any physical connection to it.

The shape of the movable insert may also be varied, including rectangular-, circular-, triangular-shaped inserts, etc. Placement of each electrical connection configuration within the insert may also be varied as appropriate. For example, moving between series and parallel configurations may involve a 90° rotation, a 180° rotation, etc. Likewise moving between on and off configurations or any two configurations may involve a rotation of arbitrary degrees. Depending on the placement of configurations and the shape of the insert, the insert may be configured to move between positions by sliding, flipping, pressing, or other movements, either in addition to or instead of rotating the insert. According to various embodiments, the insert may be snap fitted (i.e., held by tension), bolted, clamped, held by magnetic or other force, or fit by any other appropriate technique into, around, or next to the housing or base and may be inserted or otherwise attached and removed from the housing or base with relative ease. As indicated above, the term "insert" is broadly intended to cover any member, part or unit that is separable from and configured to interface with a housing, base or other fixed part of a J-box or other connection box on the module. This includes a part that fits within or is insertable into a recessed portion of a fixed part, a part that fits around a fixed part or a portion thereof, etc. In certain embodiments, the insert and housing or other fixed part are configured to interface with each other by complementary male/female members.

In certain embodiments, the insert is movable and/or removable only with the aid of a tool. The tool may be a commonly available tool, such as a screwdriver, or a specially configured tool. In certain embodiments, the insert includes a feature configured to interface with the tool to move the insert between positions. The feature may include a recess, e.g., to fit a screwdriver or uniquely shaped tool, a latch, a button, or other feature that requires a tool to interface with it.

The J-boxes described herein are generally movable between at least two operating positions associated with different electrical connection configurations. Possible operating configurations include on, off, on-series, on-parallel, and bypass. While FIGS. 3A-3E depict two cell strings, one of skill in the art will understand how to implement the J-boxes described herein with any number of cell strings in a module, e.g., one string, two strings, three strings, four strings or more. Similarly, the number of cells on a string may vary as appropriate for the particular module. Also, a solar module assembly may include a single solar module or any number of modules and interconnection schemes.

According to various embodiments, the J-boxes described herein may include easily replaceable diodes. In certain embodiments, the diodes are part of the circuitry in the insert, as depicted above in FIGS. 3A-3E. With inserts that are removable or otherwise accessible (e.g., by flipping the insert to exposed the diodes), the diodes may be easily replaced.

Figure 4:
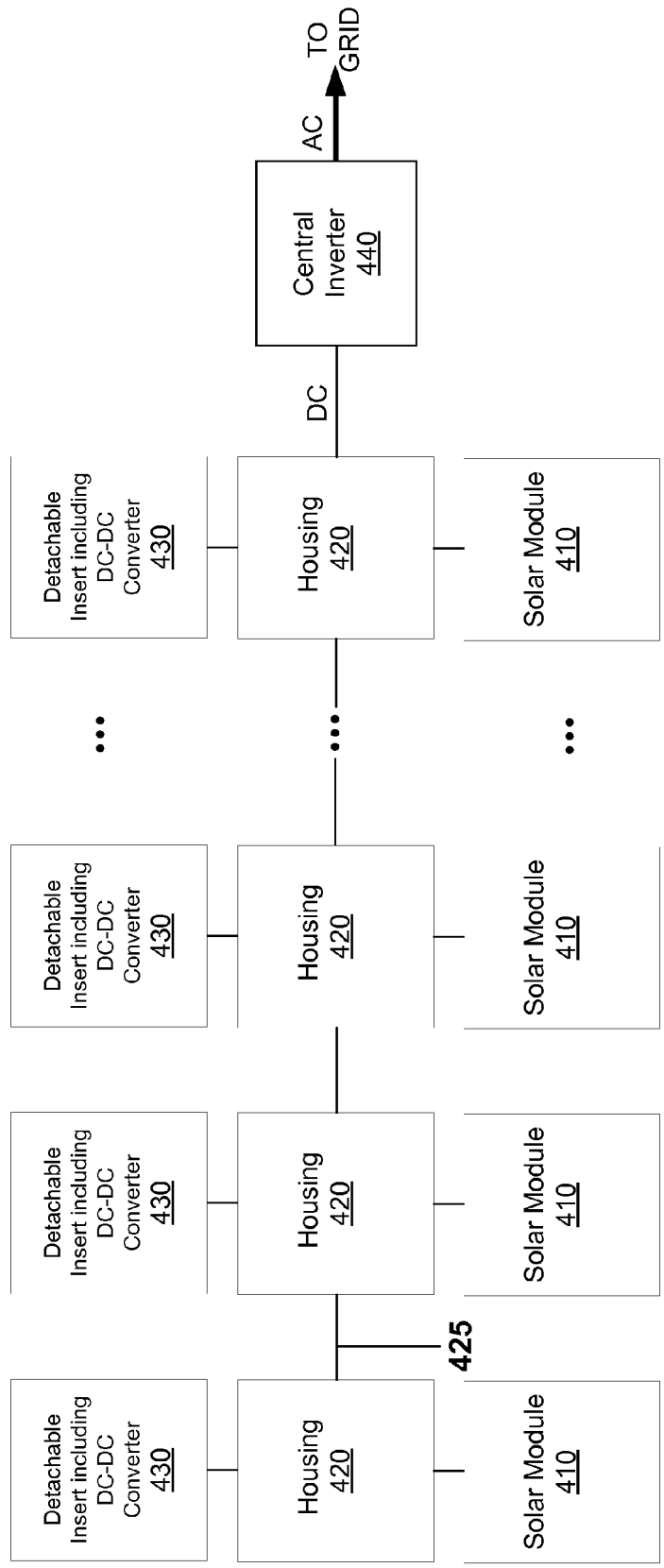
FIG. 4 is a diagram of solar modules, including detachable inserts each having a DC/DC converter, connected to a central inverter.

In certain embodiments, the J-boxes described herein include DC/DC converters. FIG. 4 is a basic block diagram illustrating an array of solar modules 410 connected in series. In the example presented in FIG. 4, solar modules are interconnected via housings 420, with a housing 420 mounted on or otherwise connected to or attached to each solar module 410. In certain embodiments, the housing 420 is integral to the encapsulation or other housing of solar module 410. As described above, the housing may be a junction box housing or other external connection. A detachable insert 430 including DC/DC converter is connected to each module 410, in this example, via housing 420. Input of the DC/DC converter is the DC generated by the associated solar module 410. The DC/DC converter converts the input DC to the voltage level required by central inverter 440. The output DC is transmitted through housing 420 to central inverter 440 via conductor 425. Using DC/DC converters allows each module 410 to operate at its optimum current/voltage. The DC/DC converter may operate in buck or boost mode as appropriate. In certain embodiments, it includes a buck converter connected to a boost converter. Once converted to AC by inverter 440, the generated power may be transmitted to a grid or other AC electrical system.

In certain embodiments, the insert 430 is movable between operating positions as described above. So, for example, in one position the insert 430 may be associated with an off position (DC disconnect, no current to conductor 425), while in another position the insert 430 is associated with an on position including DC/DC conversion. On-series with DC/DC conversion, on-parallel with DC/DC conversion and bypass modes may also be supported as described above. As described further below, in certain embodiments, the insert is associated with only one operating position, but is detachable, e.g., for easy replacement of the insert or its components.

Figure 5:
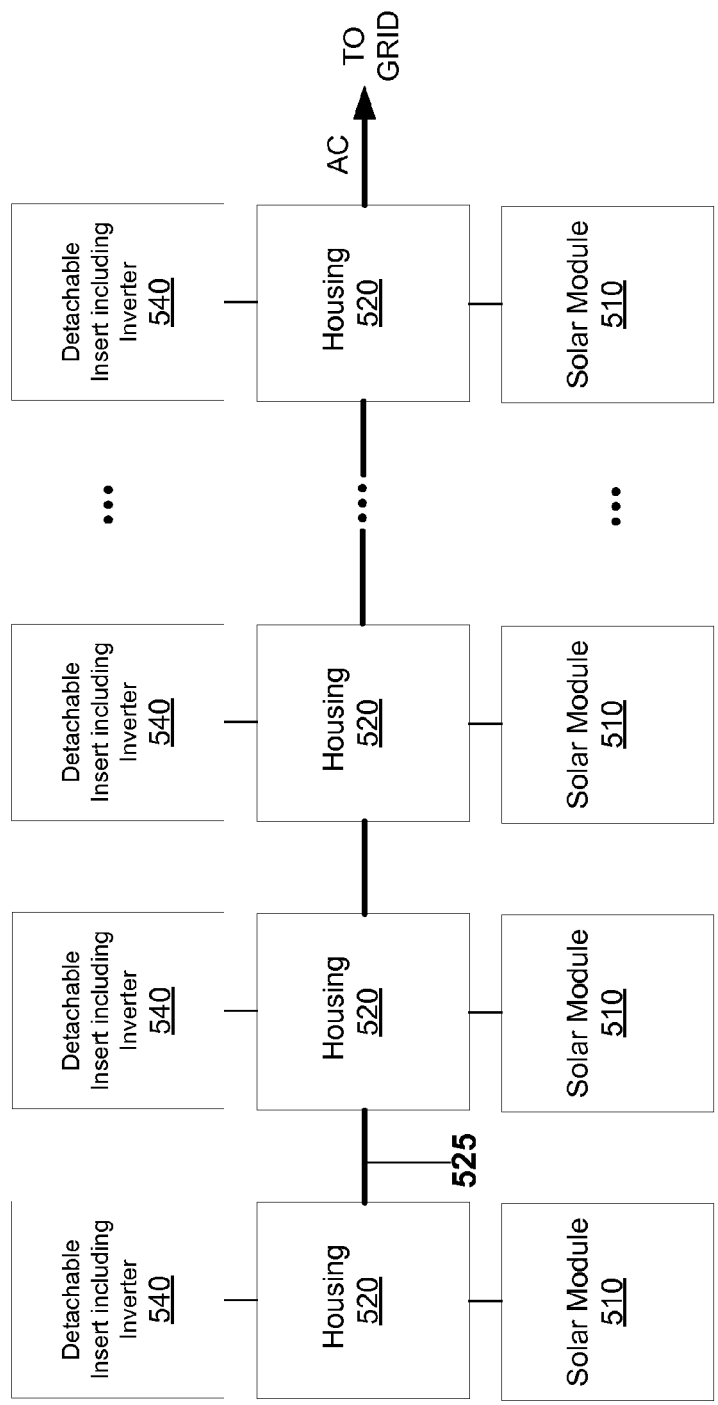
FIG. 5 is a diagram of solar modules including detachable inserts each having an inverter.

According to various embodiments, the J-boxes described herein may also include an inverter configured to convert DC current from the module to AC for transmission to a grid. For example, a J-box may contain a DC/AC inverter circuit. Arrays of solar panels having per-panel inverters are also provided. These may be advantageous as a central inverter, such as used in the system depicted in FIG. 4, is not required. FIG. 5 is a basic block diagram illustrating an array of solar modules 510 having per-module inverters. Solar modules 510 are connected in series via conductor 525. In certain embodiments, conductor 525 includes AC busbars to deliver AC to a grid or other AC electrical system. A detachable insert 540 including an inverter is connected to each module 510, in this example, via housing 520. Input of the inverter is the DC generated by the associated solar module 510. The inverter converts the input DC to AC, which is transmitted through housing 520 to a grid via conductor 525.

In certain embodiments, the insert 540 is movable between operating positions as described above. So, for example, in one position the insert 540 may be associated with an off position (DC disconnect, no current to conductor 525), while in another position the insert 540 is associated with an on position including DC/AC conversion. On-series with DC/AC conversion, on-parallel with DC/AC conversion and bypass modes may also be supported as described above. It should be noted that although FIGS. 4 and 5 show the individual modules interconnected via the housings 520, other connection schemes may be employed. For example, the modules may be connected via the detachable or movable inserts as depicted in FIGS. 2C and 2D.

As discussed further below, in certain embodiments, inserts such as insert 430 and 540 are not rotatable or otherwise movable between operating positions, but are detachable, e.g., to disconnect a module or replace components within the insert, etc.

Examples of DC/DC converters and inverters that may be used in accordance with certain embodiments are described in commonly-assigned U.S. patent application Ser. Nos. 12/379,196 and 12/379,197, incorporated by reference herein. According to various embodiments, replaceable inserts including any or all of diodes, DC/DC converters, inverters, or other solar module electrical components, to facilitate replacement of these components are provided. An inverter, for example, may have a useful life of no more than five years. To replace an inverter on a particular module, the insert is removed from the housing, e.g., using a tool. No longer electrically connected to the array or module, the inverter can be easily and safely replaced, and the insert containing the replacement inverter reinserted to the housing.

As indicated above, in certain embodiments, the insert containing the inverter or other component(s) may also be movable between operating positions to change the electrical connection configuration of the cells or modules. In other embodiments, the insert is not movable between operating positions, but is still configured to be detached and reattached as described above. In this manner, components contained in the insert may still be easily replaced. Regardless of whether an insert is associated with multiple operating positions or not, in certain embodiments the housing without the insert is not active and its module is not electrically connected to the array. These replaceable inserts may fit into junction box housing, as described above, or into other housing, base or fixed component, mounted on or in electrical contact with the module.

According to various embodiments, detachable inserts or components that include one or more circuitry elements, including but not limited to, one or more diodes, inverters or DC/DC converters, are provided. Certain embodiments of the detachable inverters, DC/DC converters, diodes, etc., are described above. A detachable inverter, for example, is an inverter that can be easily detached from its respective photovoltaic module, or if an inverter for an entire array or multiple modules, from its operating position.

In certain embodiments, detachable inserts containing one or more components for solar module or solar module array electrical connection are provided. Certain embodiments of the detachable inserts are described above. According to various embodiments, the detachable inserts are not movable between operating positions and are associated with only one electrical connection configuration when inserted. For example, referring to FIGS. 2A-2D, in certain embodiments, the insert 220 may be configured to be inserted into or plugged onto a housing 230, in a single orientation, e.g., such that the module is on when inserted and off when not inserted. In other embodiments, the insert may be configured such that a single electrical connection configuration is associated with multiple orientations of the insert.

Figure 6:
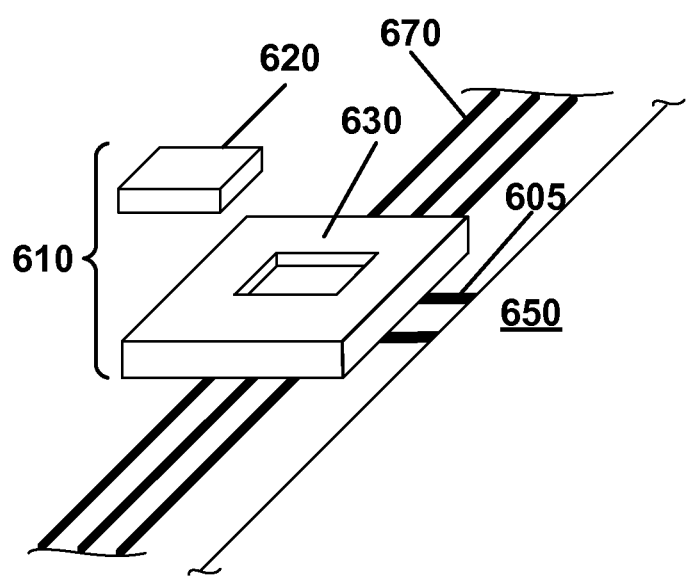
FIG. 6 depicts a detachable inverter connected to a solar module in a detached, non-operating position.

The detachable inserts may include any electrical component associated with a solar module or module array including but not limited to inverters, DC/DC converters, diodes, connectors and conductors. FIG. 6 shows an example of an embodiment including inverter 610, including insert or inverter element 620, which may include a DC/AC inverter circuit, and an inverter housing 630. In this example, the inverter housing 630 is electrically connected via DC busbars 605 to the photovoltaic module 650. The inverter housing 630 also electrically contacts AC busbars 670. The inverter 610 is electrically connected to the module 650 via DC busbars 605, which are integrated with the string. While in this example inverter 610 is located adjacent to its respective photovoltaic module 650, the location of the inverter 610 relative to its respective photovoltaic module 650 is not particularly restricted as long as the inverter is electrically connected to the module. According to other embodiments, the inverter housing may also be mounted on a module, e.g., as J-box housing 220 is in FIGS. 2A-2D.

The inverter housing 630 without a detachable inverter element 620 is not active, i.e. it can not convert DC of the photovoltaic module into AC. The insert 620 is detachably located in the housing 630. As described above, the insert 620 may be of any appropriate shape or size, and may be snap fitted, bolted and/or clamped into the housing 630 and may be inserted and removed from the housing 630 with relative ease. Also as described above, in certain embodiments, the insert is removable only with the aid of a tool.

The detachable inserts are not limited to housing inverter circuitry but may house DC/DC converter circuitry, diodes, etc. In complex designs, it may be useful to house part of the circuit in a fixed part and part of the circuit in an insert. Generally, the inverter, DC/DC converter, or other component is not active when the insert is detached or, if movable between operating positions, in an off position.

As described above, e.g., with respect to FIGS. 4 and 5, in certain embodiments, the detachable inverters, DC/DC converters or other components, are each associated with a solar module. In other embodiments, a detachable inverter or other component may be associated with multiple modules or an entire array.

In addition to facilitating component replacement, the inserts described herein can be advantageous for safe shipping of the system. For example, the system can be shipped in an inactive state without the detachable inverter insert installed, and later activated by installing the detachable inverter inserts. Detachable inverter inserts or elements are described in U.S. patent application Ser. No. 11/777,397 (published as U.S. Patent Publication No. 2009/0014058), incorporated by reference herein.

In certain embodiments, a replaceable insert and housing is provided in which connections between insert circuitry and housing circuitry are made via a connector structure including one or more male connectors on the insert and one or more corresponding finger-safe female connectors in the housing. Because the insert is not electrically connected once removed, the male connectors may be exposed during safe installation or replacement activities. Also as indicated above, once inserted, the insert may provide a hermetic seal. In certain embodiments, the insert may be movable between an on and off position, e.g., such that the insert provides a protective, hermetic seal when in an off position. The ease and safety provided by the replaceable and/or movable junction boxes and inserts described herein allow non-professionals, such as homeowners, to replace components and perform other minor maintenance and upkeep functions. In other embodiments, an insert having no activate-able components may be provided to provide a protective, hermetic seal during replacement, maintenance or other inactive periods.

Although the foregoing invention has been described in some detail for purposes of clarity of understanding, it will be apparent that certain changes and modifications may be practiced within the scope of the invention. It should be noted that there are many alternative ways of implementing both the processes and apparatuses of the present invention. Accordingly, the present embodiments are to be considered as illustrative and not restrictive, and the invention is not to be limited to the details given herein.

What is claimed is:

1. A junction box for a solar module comprising:
a junction box connectable to a solar module assembly, said solar module assembly comprising a plurality of interconnected solar cells, wherein the junction box is movable between at least two operating positions, wherein each position is associated with a different solar cell electrical connection configuration, wherein the junction box is rotatable between the at least two operating positions.

2. The junction box of claim 1 wherein the junction box comprises a housing and an insert movable between the at least two operating positions.

3. The junction box of claim 2 wherein the housing comprises external connection points.

4. The junction box of claim 2 wherein the insert is removable.

5. The junction box of claim 2 wherein the insert is replaceable.

6. The junction box of claim 1 wherein at least one solar cell electrical connection configuration is selected from: a series configuration, a series-parallel configuration, an off position, and a bypass configuration.

7. The junction box of claim 2 wherein the insert comprises at least some of connectors, diodes and conductors configured such that moving the insert between the at least two operating positions changes the solar cell electrical connection configuration.

8. The junction box of claim 2 wherein the insert comprises an inverter.

9. The junction box of claim 2 wherein the insert comprises a DC/DC converter.

10. The junction box of claim 1 further comprising a tool interface feature configured to interface with a tool whereby the junction box can be moved between alternative operating positions.

11. The junction box of claim 1 wherein the junction box is mountable on a solar module assembly.

12. A solar module assembly comprising:
a plurality of interconnected solar modules, each module comprising at least one solar cell string and at least one external connection mechanism for interconnecting the modules, wherein the at least one external connection mechanism is movable between operating positions to change an electrical connection configuration of interconnected modules or connected cell strings within a module, wherein the at least one external connection mechanism is a junction box, rotatable to change the electrical connection configuration of interconnected modules or connected cell strings within a module, having connectors attached thereto.

13. The solar module assembly of claim 12 wherein the junction box comprises a housing and a movable insert.

14. The solar module assembly of claim 13 wherein the insert comprises at least some of connectors, diodes and conductors configured such that moving the insert changes the electrical connection configuration.

15. The solar module assembly of claim 12 wherein at least one electrical connection configuration is selected from: a series configuration, a series-parallel configuration, an off position, and a bypass configuration.

16. The solar module assembly of claim 12 wherein an integrated inverter is associated with each solar module.

17. The solar module assembly of claim 16 wherein the integrated inverter is housed in a removable insert.

18. The solar module assembly of claim 12 wherein a DC/DC converter is associated with each solar module.

19. The solar module assembly of claim 18 wherein the DC/DC converter is housed in a removable insert.

20. A method of installing or servicing a solar module system including at least one solar module having a plurality of interconnected solar cells, the method comprising rotating a junction box mounted on a solar module between a first operating position and a second operating position to thereby change the solar cell electrical connection configuration.

* * * * *